7254X
H. King,
Wrench.
Patented Oct. 25, 1832
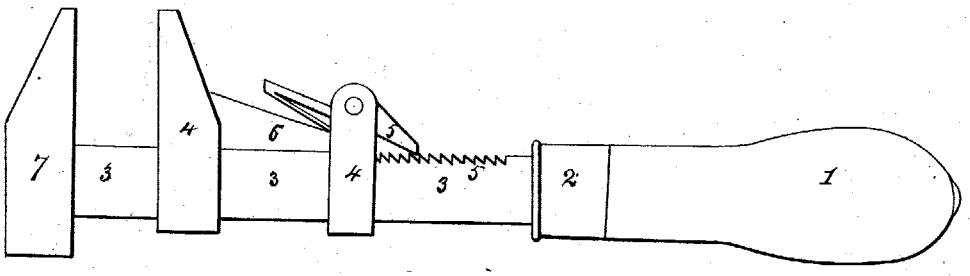
N. PETERS, PHOTO-LITHOGRAPHER, WASHINGTON, D. C.

13

Oct. 25. 1832 209

7254X

Henry King
Letters Patent.

The Schedule referred to in these Letters Patent, and making part of the same, containing a description in the words of the said Henry King, himself of his improvement in the Rack wrench It is composed of a handle of hard wood or any other hard material into which a square bar of iron passes & is riveted upon the other end of said bar is a hammer & upon the upper side of this bar is a ratchet into which a click is forced by a spring which moves upon a pivot in a slide which slides upon the bar in order to prevent the movement of the slide towards the handle & to secure its situation & also to regulate the distance between one end of the slide & the hammer which taken together form the jaws of the wrench The slide is composed of three parts, one of which is a jaw of the wrench, another part is an upright piece to which the click and spring are attached, these two uprights are connected together by a piece of iron (the same thickness as the main bar) and welded firmly at each end... The slide is made to move upon the bar by the bar passing thro' it in such a manner that it cannot be detached... The machine being placed upon a nut or bar and the slide moved up, it will be held there by the click passing into the ratchet, it will then be evident that by taking hold of the handle and moving it, it will turn the nut or bar.—

The applicant claims as his invention on the above, the use of the ratchet and click...

Exd.
W.H.

Witnesses
[illegible] Bliss
[illegible] Lathrop

Henry King 312 words